United States Patent
Tempelmeier

(10) Patent No.: US 10,335,866 B2
(45) Date of Patent: Jul. 2, 2019

(54) METHOD FOR PRODUCING A ROTARY TOOL AND ROTARY TOOL

(71) Applicant: Kennametal Inc., Latrobe, PA (US)

(72) Inventor: Julia Tempelmeier, Roth (DE)

(73) Assignee: KENNAMETAL INC., Latrobe, PA (US)

( * ) Notice: Subject to any disclaimer, the term of this patent is extended or adjusted under 35 U.S.C. 154(b) by 105 days.

(21) Appl. No.: 15/406,269

(22) Filed: Jan. 13, 2017

(65) Prior Publication Data
US 2017/0203374 A1    Jul. 20, 2017

(30) Foreign Application Priority Data
Jan. 14, 2016    (DE) .................. 10 2016 200 404

(51) Int. Cl.
*B23B 51/00* (2006.01)
*B23B 51/02* (2006.01)

(52) U.S. Cl.
CPC .......... *B23B 51/02* (2013.01); *B23B 2251/04* (2013.01); *B23B 2251/043* (2013.01)

(58) Field of Classification Search
CPC ........ B23B 2251/043; B23B 2251/406; B23B 2251/408; B23B 2251/426; B23B 51/02; Y10T 408/905; Y10T 408/906; Y10T 408/9065; Y10T 408/909; Y10T 408/9095; Y10T 408/90974
See application file for complete search history.

(56) References Cited

U.S. PATENT DOCUMENTS

| 308,707 | A | * | 12/1884 | Shirk | ...... B23B 51/02 408/230 |
| 750,537 | A | | 1/1904 | Hanson | |
| 4,274,771 | A | * | 6/1981 | Nishimura | ...... B23B 51/08 407/53 |
| 2005/0117982 | A1 | * | 6/2005 | Dov | ...... B23B 51/08 408/24 |
| 2006/0115339 | A1 | * | 6/2006 | Wakui | ...... B23B 51/02 408/230 |

FOREIGN PATENT DOCUMENTS

| DE | 69209034 T3 | 2/2004 |
| EP | 1396303 B1 | 11/2013 |
| JP | 2002144122 A | * 5/2002 |
| JP | 2009190116 A | * 8/2009 |

OTHER PUBLICATIONS

JP 2002 144122 Machine Translation, pp. 4-10, Dec. 16, 2015.*
Nov. 29, 2016 First office action P15-06075-DE-NP.

* cited by examiner

*Primary Examiner* — Nicole N Ramos
(74) *Attorney, Agent, or Firm* — Matthew S. Bedsole

(57) ABSTRACT

A method is specified for producing a rotary tool (2) having a base body (4), which extends in a longitudinal direction (L) and in which at least one flute (6) is ground in by grinding in a first partial flute (12A) with a first helix angle (W1) in a first grinding step and by subsequently grinding in a second partial flute (12B) with a second helix angle (W2) in a second grinding step, the second helix angle differing from the first helix angle (W1) so that a flute (6) that expands in the longitudinal direction (L) is formed, wherein the two partial flutes (12A, 12B) are ground in using the same grinding wheel (11). In this way, a particularly quick production is realized. Furthermore, a corresponding rotary tool (2) is specified.

7 Claims, 2 Drawing Sheets

METHOD FOR PRODUCING A ROTARY TOOL AND ROTARY TOOL

RELATED APPLICATIONS

This application claims priority to German Patent Application No. 1020162004042, filed Jan. 14, 2016. The contents of the foregoing application are incorporated herein by reference in their entirety.

FIELD OF THE INVENTION

The present invention relates to improved rotary tools and improved methods of producing such rotary tools.

BACKGROUND

The invention relates to a method for producing a rotary tool, which comprises a base body, which extends in a longitudinal direction and in which at least one flute is ground in by grinding in a first partial flute with a first helix angle in a first grinding step and by subsequently grinding in a second partial flute with a second helix angle that is different form the first helix angle in a second grinding step, so that a flute that expands in the longitudinal direction is formed. The invention furthermore relates to a rotary tool.

An appropriate rotary tool is described in U.S. Pat. No. 750,537, for example. The rotary tool shown there has two flutes, which substantially coincide and are connected to one another and thereby form a flute with an increasing width. For this purpose, the first flute is introduced first and then, along an edge of this flute, a second flute with a lesser flute depth is formed.

SUMMARY OF THE INVENTION

In one aspect, methods for producing a rotary tool, in particular a drill, having a base body which extends in a longitudinal direction are described herein.

Methods for producing a rotary tool described herein comprise grinding a first partial flute in a first grinding step and subsequently grinding a second partial flute in a second grinding step. The first partial flute has a first helix angle, and the second partial flute has a second helix angle. The first and second partial flutes together form at least one flute on the base body of the rotary tool, the at least one flute expanding in the longitudinal direction. The first partial flute and the second partial flute are ground using the same grinding wheel.

In another aspect, rotary tools are described herein.

In some embodiments, a rotary tool, in particular a drill, are described herein which comprise a base body extending in a longitudinal direction, the base body having at least one flute. The at least one flute is formed by a first partial flute having a first helix angle and a second partial flute having a second helix angle. The first partial flute and the second partial flute together form a flute. The first helix angle differs from the second helix angle so that the flute expands in the longitudinal direction. The first partial flute and the second partial flute are ground to the same flute depth.

In certain other embodiments, a rotary tool described herein comprises a base body extending in a longitudinal direction, the base body having at least one flute. The at least one flute is formed by a first partial flute having a first helix angle and a second partial flute having a second helix angle. The first partial flute and the second partial flute together form a flute. The first helix angle differs from the second helix angle so that the flute expands in the longitudinal direction. The second partial flute is ground with a better surface quality than the first partial flute.

These and other embodiments will be described further in the detailed description which follows.

DETAILED DESCRIPTION

Figure 1:
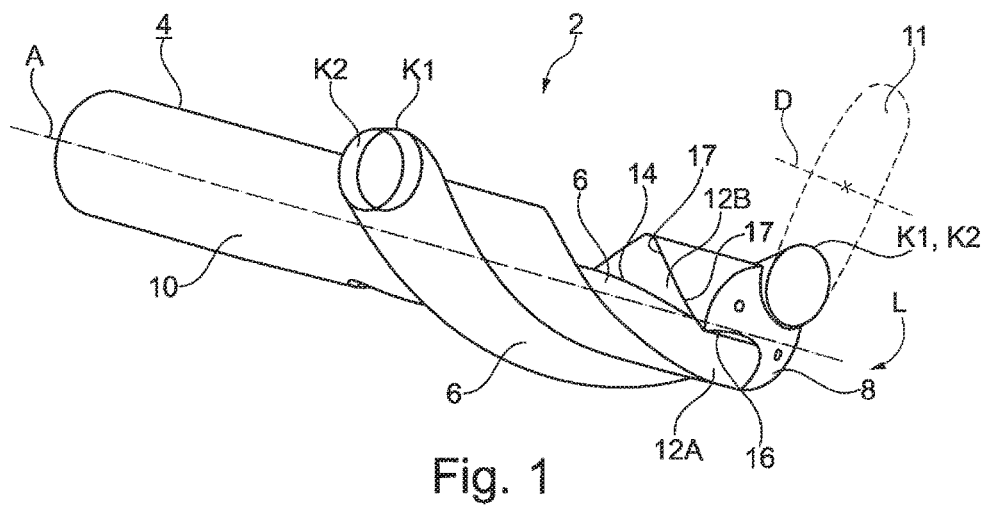
FIG. 1 illustrates a perspective view of a rotary tool according to the present disclosure.

Embodiments described herein can be understood more readily by reference to the following detailed description and examples and their previous and following descriptions. Elements and apparatus described herein, however, are not limited to the specific embodiments presented in the detailed description. It should be recognized that these embodiments are merely illustrative of the principles of the present invention. Numerous modifications and adaptations will be readily apparent to those of skill in the art without departing from the spirit and scope of the invention.

The method according to the present invention is used for the production of a rotary tool, such as a drill or a milling cutter. The rotary tool comprises a base body, which extends in a longitudinal direction and in which at least one flute is ground in during production by grinding in a first partial flute with a first helix angle in a first grinding step and by subsequently grinding in a second partial flute with a second helix angle in a second grinding step. In doing so, the two helix angles are selected such that the second helix angle differs from the first helix angle so that a flute expanding in the longitudinal direction is formed, said flute being composed of two partial flutes. In the process, the two partial flutes are ground in using the same grinding wheel. The flute is thus formed in several parts, in particular in two parts, namely from several, in particular two, partial flutes, which are ground in one after the other so that these partial flutes partially overlap.

As a result of the expanded flute, a larger capacity for the removal of chips is advantageously created, which chips are removed during operation from the material being processed.

A substantial additional advantage of the invention consists in particular in that as a result of the use of the same grinding wheel to form the two partial flutes, the production time and machine expenditure are significantly reduced. In particular, only the helix angle must be adjusted for grinding in the second partial flute. On the other hand, however, a changing of the grinding wheel is dispensed with. Overall, an expanding flute is thus produced in a particularly simple manner, which flute ensures an improved removal of chips during operation.

The rotary tool and thus also its base body extend in a longitudinal direction and along a longitudinal axis, which at the same time is an axis of rotation, about which the rotary tool rotates during operation. The rotary tool has on its front side a tool front, which abuts against the material during operation and has a number of cutting edges for machining the material. The flute extends along the base body and is, in many embodiments, coiled or spiral-shaped. The rotary tool is, for example, a drill.

In some embodiments, the rotary tool is formed as one piece. The base body in particular consists of only one single material, such as cemented carbide or tool steel. In a variant, the base body is provided on its front side with a coating. Alternatively, the rotary tool is modular, with a base body, on or in which an insert is secured, such as a cutting insert, a cutting plate, or a cutting head. In a modular rotary tool, at least one flute, which in particular extends from the insert, is then also introduced into the base body. In particular when using a cutting head, the flute is continued in the insert, is however not necessarily formed by two overlapping partial flutes in the insert in this case. It is rather essential that the flute is made from overlapping partial flutes at least in the base body. As a result, in particular traditional inserts can advantageously continue to be used.

Due to the geometry of the grinding wheel, the partial flutes respectively have an appropriate cross-section with an in particular circular arc-shaped contour when viewed transversely to the longitudinal axis. As a result of the overlapping of the partial flutes, their contours form an intersection point, which marks a tip of a rib, which extends along the flute and within in. In some embodiments, the two partial flutes coincide at the tool front so that the contours also coincide there accordingly and the rib is formed in the further, diverging course of the partial flutes away from the tool head.

The flute generally defines a core of the base body with a core radius and a corresponding core diameter. In this respect, the core radius is determined in a respective cross-sectional plane orthogonal to the longitudinal direction by the shortest distance between the longitudinal axis and a wall or flute wall of the flute. The core thus defines a flute depth of the flute as half the difference between a nominal diameter of the rotary tool and the core diameter. The nominal diameter is defined by an outer circular line, along which a radially outer cutting edge of the rotary tool extends. In some embodiments, the core radius, and thus also the core diameter, is constant in the longitudinal direction. Thus, only the width and not the depth of the flute expands. The flute depth of the partial flutes is, in many embodiments, constant in the longitudinal direction. Accordingly, the flute depth of the entire flute is then also constant in the longitudinal direction. As a result, a sufficiently strong core remains in order to ensure a good stability of the rotary tool during operation.

In some embodiments, the two partial flutes are ground in with the same flute depth, i.e. the partial flutes are respectively ground in with a flute depth and the two flute depths are equal. This also reduces the parameter range in the production of the rotary tool. In particular, only a different helix angle needs to be set, whereas the flute depth from the first grinding step is maintained. In addition, as a result of the similar design of the partial flutes with respect to their flute depth, maximum space for the removal of chips is provided without weakening the core.

The flute depth is in particular measured in the radial direction of the rotary tool, i.e. orthogonally to the longitudinal axis. As already described above in connection with the entire flute, the flute depth of a single partial flute also results as the difference between the nominal diameter of the rotary tool and the core diameter, in this case however accordingly in relation to one single partial flute. The flute depth is in particular measured along a straight line through the longitudinal axis and a respective center of a circle along the circular arc-shaped contour.

As a result of the design with the same flute depth, the flute is substantially symmetrical in its cross-section transverse to the longitudinal direction with respect to an axis of symmetry, which extends through the tip of the rib and a center of the rotary tool, i.e. orthogonally to the longitudinal axis in the radial direction. "Substantially symmetrical" in this respect refers in particular to the flute being symmetrical but only due to the in particular spiral course of the partial flutes and not precisely symmetrical in particular also due to the different helix angles.

In another embodiment, the second partial flute is ground in with a better surface quality than the first partial flute. For this purpose, in the second grinding step, the grinding wheel is operated at an increased rotational speed, for example, or is moved more slowly along the base body. Alternatively or additionally, only rough machining is performed in the first grinding step, for example. The first partial flute is therefore generally introduced by a so-called roughing process and the second partial flute by a so-called finishing process. By the merely rough design of the first partial flute compared to the second partial flute, additional time is saved during production. This is based on the knowledge that the two partial flutes overlap to the greatest extent possible due to the merely small difference between the helix angles and that the entire flute then therefore has nevertheless predominantly the better surface quality despite the rough design of the first partial flute. This is in particular achieved by precisely the second partial flute, i.e. the flute formed after the first partial flute, being formed with the better surface quality. In particular in one embodiment, in which the two partial flutes coincide on the front side of the rotary tool, the surface quality of the entire flute on the front side then corresponds precisely to the better surface quality, which ensures a good removal of chips during operation. Only as a result of the expansion along the longitudinal axis of the rotary tool, a region of lesser surface quality appears, which region in particular becomes wider in the longitudinal direction and away from the tool front.

"Better surface quality" in particular refers to less roughness. Accordingly, the roughness of the second partial flute is less than the roughness of the first partial flute in the aforementioned embodiment. The roughness of the first partial flute is, in some embodiments, greater than the roughness of the second partial flute by at least 10%.

The two helix angles are in particular in the range of 5 to 35°. Expediently, the two helix angles differ by no more than 5°, in particular however at least by 1°. In some embodiments, a respective helix angle along the flute is constant, which further simplifies production.

In another embodiment, the second helix angle is larger than the first helix angle. In other words: The second partial flute is ground in with a smaller helix angle than the first partial flute. In particular in combination with the aforementioned different surface qualities of the partial flutes, it is advantageously ensured in this embodiment that the chips removed during operation are substantially guided along the partial flute with the better surface quality. This is based on the consideration that the flute as a whole constitutes a guide channel for chips, which guide channel is only partially delimited on the front side of the rotary tool by the cutting edge so that the chips are transported at least in the front region of the rotary tool primarily on one side of the flute, namely on the side that adjoins the cutting edge. This side is however formed by the partial flute with the lesser helix angle so that precisely this partial flute is expediently ground in with a good surface quality for the chip transport. In particular in combination with the considerations above regarding the surface quality, the second partial flute is therefore ground in with the lesser helix angle.

Turning now to the Figures, FIG. 1 shows a perspective view of a rotary tool 2, which is designed as a drill having a base body 4, in which two flutes 6 are ground in in this case. The rotary tool 2 extends in a longitudinal direction L and along a longitudinal axis A, which is also an axis of rotation of the rotary tool 2. In the example shown here, the flutes 6 are coiled and extend along the base body 4 from a tool front 8, in this case a tool tip, to a shaft 10.

In this case, the flutes 6 are respectively ground in using a grinding wheel 11, which is shown schematically in FIG. 1 at one of the flutes 6 and indicated in a very simplified manner as a dashed line. For grinding, the grinding wheel 11 rotates about an axis of rotation D. Flute 6 is made in two grinding steps from two partial flutes 12A, 12B, which are ground in using the same grinding wheel. In the process, one of the partial flutes 12A, 12B is first ground in as first partial flute 12A and the other partial flute 12B is subsequently ground in as second partial flute 12B. Both partial flutes 12A, 12B start at the tool front 8 and overlap completely at this location. The two partial flutes 12A, 12B are however implemented with different helix angles W1, W2 so that the two partial flutes 12A, 12B diverge in the course toward the shaft 10 and the flute 6 is formed as an expanded flute 6. This can be seen in particular clearly in the lateral view in FIG. 2, which also shows a rib 14, which is formed in the flute 6 as a result of the diverging partial flutes 12A, 12B. The diverging of the partial flutes 12A, 12B is indicated in FIG. 1 by two circles K1, K2, which overlap on the front side and are displaced relative to each other on the shaft side.

The first partial flute 12A is formed with a first helix angle W1, which is larger than the second helix angle W2, at which the second partial flute 12B extends. In addition, the second partial flute 12B is formed with a better surface quality, whereas the first partial flute 12A is, for example, only rough-machined. Because the second partial flute 12B ground in later has the better surface quality, the entire flute also predominantly has the better surface quality, especially since the two partial flutes 12A, 12B overlap to the largest extent possible due to the merely small difference between the helix angles W1, W2 and since the first partial flute 12A is therefore effectively subsequently partially ground during grinding in of the second partial flute 12B.

As can be seen in particular in FIG. 1, the rotary tool 2 has on its front side a cutting edge 16, at which a chip is produced during operation. The cutting edge 16 transitions at a cutting corner into an edge 17, which delimits the flute 6 and which generally is formed as a so-called minor cutting edge. The part of the flute 6 that adjoins the edge 17 is formed by the partial flute 12A, 12B with the lesser helix angle W1, W2, i.e. in this case by the second partial flute 12B with the second helix angle W2. In a particularly advantageous manner, the second flute 12B is accordingly implemented using the lesser helix angle W2 in this case and at the same time has the better surface quality.

Figure 2:
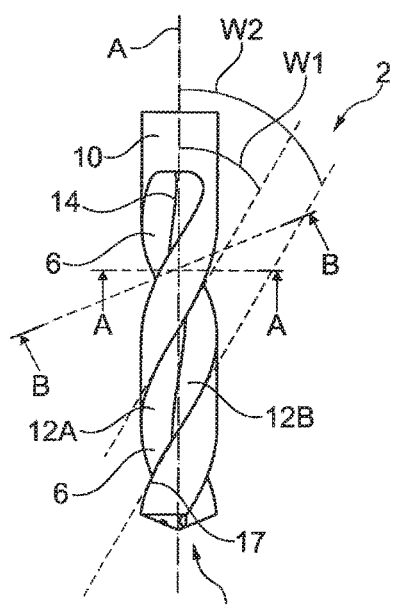
FIG. 2 illustrates a lateral view of the rotary tool of FIG. 1.
Figure 3:
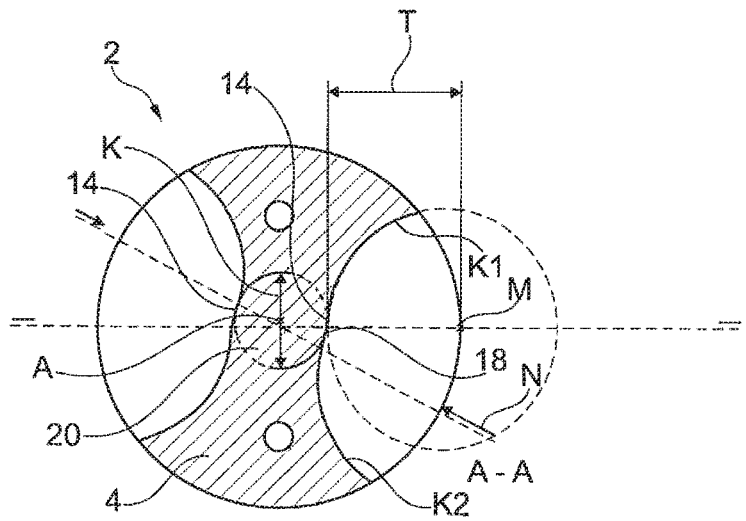
FIG. 3 illustrates a first sectional view of the rotary tool of FIG. 1.

FIG. 3 shows a sectional view of the rotary tool 2 along the cutting plane A-A, shown in FIG. 2, transverse, i.e. orthogonal, to the longitudinal axis L. The two circles K1, K2, which respectively form a circular arc-shaped contour of the respective partial flute 12A, 12B and intersect at a tip 18 of the rib 14, can be seen clearly. The flute 6 generally defines a core 20 of the base body 10 with a core radius and a corresponding core diameter K. In this respect, the core radius is determined in a respective cross-sectional plane orthogonal to the longitudinal axis A by the shortest distance between the longitudinal axis A and a wall or flute wall of the flute 6. The core 20 thus defines a flute depth T of the entire flute 6 as half the difference between a nominal diameter N of the rotary tool 2 and the core diameter K. The partial flutes 12A, 12B also respectively have a flute depth T. Both partial flutes 12A, 12B are, in some embodiments, designed with the same flute depth T so that the flute 6 is substantially symmetrical in its cross-section. The respective flute depth T of the partial flutes 12A, 12B is then also measured, as shown in FIG. 3, from the nominal diameter N of the rotary tool 2 and now to the bottom of the respective partial flute 12A, 12B, namely along a straight line through the respective center M of the circle K1, K2 and the longitudinal axis A.

In addition, as a result of the same flute depth T of the two partial flutes 12A, 12B, a particularly stable core 20 remains in the center of the base body 10. In this respect, the core 20 has a core diameter K, which corresponds to approximately the flute depth T in this case. In the longitudinal direction L, the core diameter K is constant as a result of the specific design of the two partial flutes 12A, 12B. The core diameter K and the flute depth T together result in the nominal diameter N.

Figure 4:
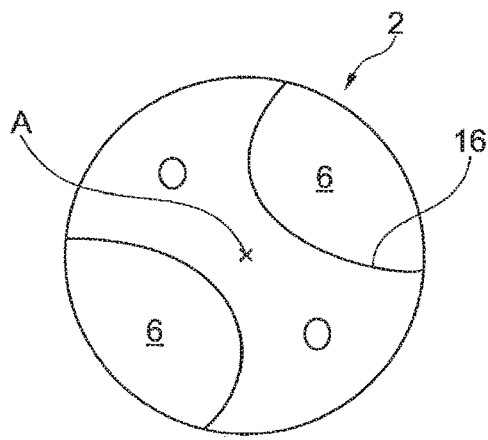
FIG. 4 illustrates a frontal view of the rotary tool of FIG. 1.

In FIG. 4, the rotary tool 2 is shown in a frontal view. Clearly shown here are the flutes 6, which seem very asymmetrical in this case due to the non-flat design of the tool front 8.

Figure 5:
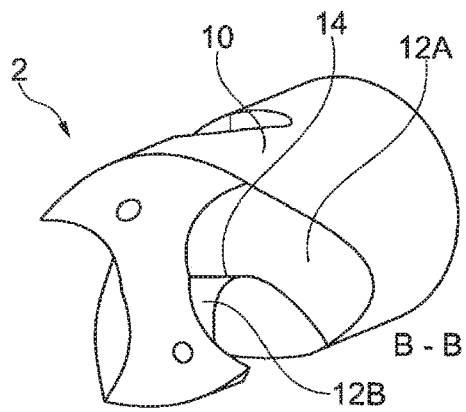
FIG. 5 illustrates a second sectional view of the rotary tool of FIG. 1.

FIG. 5 shows the rotary tool in a perspective sectional view, namely along the cutting plane B-B extending diagonally to the longitudinal axis A according to FIG. 2. Clearly shown here is rib 14, which is formed in the flute 6 by the two diverging partial flutes 12A, 12B.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A rotary tool comprising:
 a base body extending in a longitudinal direction from a shank end to a front end opposite the shank end, the base body having at least one flute,
 the at least one flute being formed by a first partial flute having a first helix angle and a second partial flute having a second helix angle,
 wherein the first partial flute and the second partial flute together form a flute;
 wherein the first helix angle differs from the second helix angle so that the flute expands in the longitudinal direction;
 wherein the first partial flute and the second partial flute are ground to the same flute depth; and
 wherein the first partial flute and the second partial flute coincide at the front end opposite the shank end.

2. The rotary tool of claim 1, wherein a core of the base body is formed by the at least one flute, the core having a core diameter which is constant in the longitudinal direction.

3. The rotary tool of claim 1, wherein the second helix angle is larger than the first helix angle.

4. A rotary tool comprising:
 a base body extending in a longitudinal direction from a shank end to a front end opposite the shank end, the base body having at least one flute, the at least one flute being formed by a first partial flute having a first helix angle and a second partial flute having a second helix angle, wherein the first partial flute and the second partial flute together form a flute;

wherein the first helix angle differs from the second helix angle so that the flute expands in the longitudinal direction; and wherein the first partial flute is ground to a first surface roughness, the second partial flute is ground to a second surface roughness, and the first surface roughness is higher than the second surface roughness.

5. The rotary tool of claim 4, wherein:

the first partial flute and the second partial flute coincide at the front end opposite the shank end.

6. The rotary tool of claim 4, wherein a core of the base body is formed by the at least one flute, the core having a core diameter which is constant in the longitudinal direction.

7. A rotary tool comprising:

a base body extending in a longitudinal direction, the base body having at least one flute, the at least one flute being formed by a first partial flute having a first helix angle and a second partial flute having a second helix angle, wherein the first partial flute and the second partial flute together form a flute;

wherein the first helix angle differs from the second helix angle so that the flute expands in the longitudinal direction;

wherein the first partial flute and the second partial flute are ground to the same flute depth; and wherein a core of the base body is formed by the at least one flute, the core having a core diameter which is constant in the longitudinal direction.

* * * * *